US008266707B2

(12) United States Patent
Savagaonkar et al.

(10) Patent No.: US 8,266,707 B2
(45) Date of Patent: Sep. 11, 2012

(54) TAMPER RESISTANT METHOD, APPARATUS AND SYSTEM FOR SECURE PORTABILITY OF DIGITAL RIGHTS MANAGEMENT-PROTECTED CONTENT

(75) Inventors: Uday Savagaonkar, Beaverton, OR (US); Prashant Dewan, Hillsboro, OR (US); Men Long, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 967 days.

(21) Appl. No.: 12/039,456

(22) Filed: Feb. 28, 2008

(65) Prior Publication Data

US 2009/0220090 A1 Sep. 3, 2009

(51) Int. Cl.
*G06F 21/00* (2006.01)
(52) U.S. Cl. ........... 726/26; 726/5; 726/18; 380/277; 713/155; 713/158; 713/168; 713/150
(58) Field of Classification Search ............... 380/277; 726/5, 18, 26; 713/155, 158
See application file for complete search history.

(56) References Cited

U.S. PATENT DOCUMENTS

| 5,634,043 | A | 5/1997 | Self et al. | |
|---|---|---|---|---|
| 7,356,147 | B2* | 4/2008 | Foster et al. | 380/281 |
| 7,552,419 | B2* | 6/2009 | Zimmer et al. | 717/121 |
| 2004/0039924 | A1 | 2/2004 | Baldwin et al. | |
| 2005/0033972 | A1* | 2/2005 | Watson | 713/189 |
| 2005/0138370 | A1* | 6/2005 | Goud et al. | 713/164 |
| 2005/0216577 | A1 | 9/2005 | Durham et al. | |
| 2005/0251867 | A1* | 11/2005 | Sastry et al. | 726/34 |
| 2005/0278499 | A1 | 12/2005 | Durham et al. | |
| 2005/0278563 | A1 | 12/2005 | Dur et al. | |
| 2005/0289311 | A1 | 12/2005 | Durham et al. | |
| 2006/0236125 | A1 | 10/2006 | Sahita et al. | |
| 2007/0005992 | A1* | 1/2007 | Schluessler et al. | 713/193 |
| 2007/0006175 | A1* | 1/2007 | Durham et al. | 717/131 |
| 2007/0094493 | A1* | 4/2007 | Ali et al. | 713/156 |
| 2007/0156999 | A1 | 7/2007 | Durham et al. | |
| 2008/0104706 | A1* | 5/2008 | Karp et al. | 726/26 |

FOREIGN PATENT DOCUMENTS

WO WO-98/47072 10/1998

OTHER PUBLICATIONS

T. Garfinkel, B. Pfaff, J. Chow, M. Rosenblum, and D. Boneh. Terra: A virtual machine-based platform for trusted computing. In Proceedings of SOSP 2003, pp. 193-206, Oct. 2003.*
Grevstad, Eric "CPU-Based Security: The NX Bit", Juniperimages, May 2005, 3 pages.
Khosravi, Hormuzd M., et al., "Dynamic Generation of Integrity Manifest for Run-Time Verification of Software Program", U.S. Appl. No. 11/967,928, filed Dec. 31, 2007, 41 pages.
Uhlig, Rich, et al., "Intel Virtualization Technology", IEEE Computer Society, May 2005, pp. 48-56.

* cited by examiner

*Primary Examiner* — Kambiz Zand
*Assistant Examiner* — Imhotep Durham
(74) *Attorney, Agent, or Firm* — Schwabe, Williamson & Wyatt, P.C.

(57) ABSTRACT

An apparatus and system provide a tamper-resistant scheme for portability of DRM-protected digital content. According to embodiments of the invention, a portable crypto unit may be utilized in conjunction with a VT integrity services (VIS) scheme as well as a Virtual Machine Manager (VMM) and a TPM to provide a secure scheme to protect digital content. Additionally, in one embodiment, the digital content may be partitioned into blocks comprising multiple segments to further enhance the security of the scheme.

19 Claims, 4 Drawing Sheets

SYSTEM 100

TAMPER RESISTANT METHOD, APPARATUS AND SYSTEM FOR SECURE PORTABILITY OF DIGITAL RIGHTS MANAGEMENT-PROTECTED CONTENT

BACKGROUND

Digital content is growing at a rapid pace and secure distribution of digital content has quickly become a serious problem faced by digital content providers. The balance of usability and security is a difficult problem and the lack of specific hardware support further complicates the issue. Providers such as Apple, Amazon, WalMart and Bit Torrent have thus each resolved the security problems raised by distribution of digital content in different ways. A number of usability problems have cropped up as a result of these varying access restrictions that have been put in place by these distributors to protect the content from unauthorized copying. For example, Amazon's "Unbox" allows the user to view the content on only two computers and only via their proprietary player. Bit Torrent's restrictions, on the other hand, allow users to view its content on only one computer.

Many of these providers have implemented their proprietary access restrictions via some type of digital rights management (DRM) scheme to protect their digital content. DRM protection typically takes the form of encryption, and the decryption keys are made available to player software through various mechanisms. To allow offline viewing of the content, the keys need to be provisioned onto the end computer. These encryption-based schemes, however, have serious limitation. For example, if an attacker knows the specifics of the DRM scheme (e.g., encryption scheme used, key schedule used, the exact keys used, etc.) the attacker may easily break the DRM scheme and utilize the content in an unauthorized fashion (e.g., make illegal copies, distribute the content illegally, etc.). To counter these threats, content providers rely on security through obscurity. More specifically, they typically do not publish the specifics of the DRM scheme and they may also hide the master keys used in the DRM scheme via software obfuscation. These measures, however, raise other problems such as interoperability. Specifically in order for a content-protection scheme to be interoperable, the specifics of the DRM scheme have to be published. As such, providers may be forced to publish their schemes and rely solely on obscuring the master keys. Examples of such obfuscation mechanisms include the various software players that implement for HD-DVD and Blue Ray playback. As is demonstrated by the recent attacks on both of these media formats though, once the format is well-known, the hidden keys may always be extracted using various software-analysis techniques.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
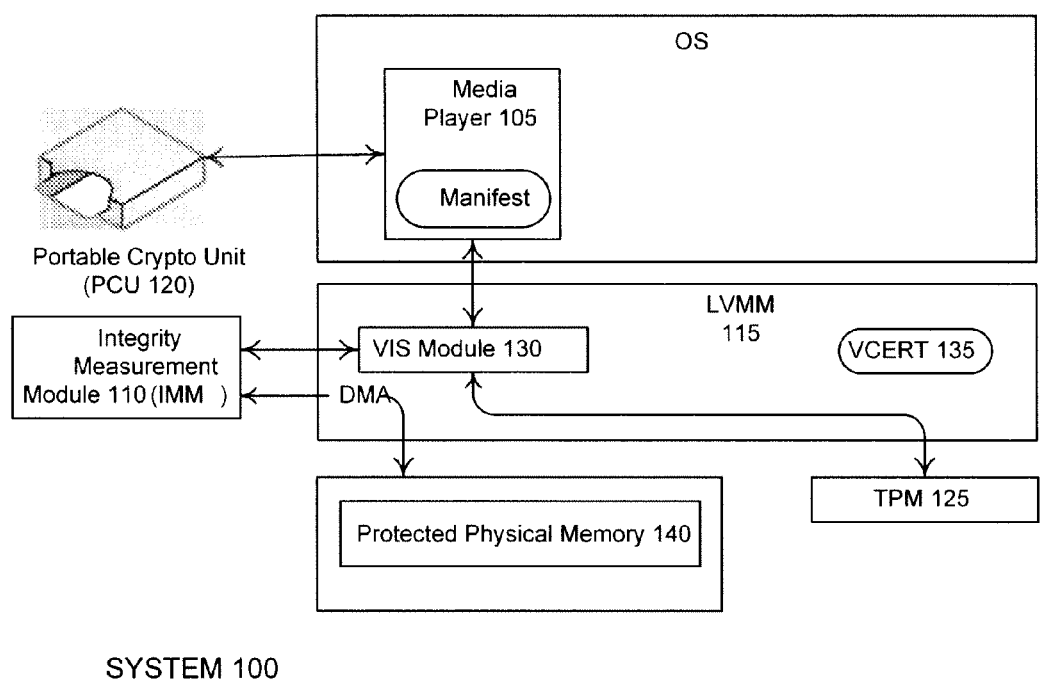
FIG. 1 illustrates a system according to an embodiment of the present invention.

Embodiments of the present invention provide a tamper-resistant method, apparatus and system for portability of DRM-protected digital content. More specifically, embodiments of the present invention utilize the fundamental protections provided by a Virtualization Technology ("VT")-based integrity scheme and a Trusted Platform Module ("TPM") to enable an interoperable, hardware-driven solution. The VT integrity scheme ("VT Integrity Services" or "VIS") referred to above may include the scheme described in co-pending patent application Ser. No. 11/395,488, entitled "Intra-Partitioning of Software Components Within an Execution Environment" (filed on Mar. 30, 2006, assigned to the assignee of the present application, hereafter referred to as "VIS Patent Application" and hereby incorporated by reference) as well as other comparable schemes. In summary, as described in the above referenced patent application, the VT integrity scheme known as VT Integrity Services or "VIS" includes a virtual machine monitor ("VMM") that controls all the resources on the platform. The VMM partitions the memory on the platform and prevents unauthorized access to applications running in each partition. This partitioning scheme is described in further detail below. TPMs are typically secure micro-controllers (including and/or coupled to secure memory) with added cryptographic functionalities that conform to the standard promulgated by the Trusted Computing Group ("TCG"). Since TPM technology such as Intel Corporation's Trusted Execution Technology ("TXT") devices are well known to those of ordinary skill in the art, further description thereof is omitted herein.

Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

The following is an overview of an embodiment of the present invention. Media files containing digital content may be encrypted using a set of keys. This set of keys may, in turn, be encrypted using a media-specific and/or user-specific master key and the encrypted set of keys may be stored along with the encrypted media. In one embodiment, the user may be provided with the master key on a tamper-resistant Portable Crypto Unit ("PCU"), described in further detail below) when the user purchases the media. This may be done, for example, by asking the user to insert the PCU into a reader and delivering the key to the PCU at the time of media purchase. In an alternate embodiment, no additional hardware may be required and a TPM on a platform may be responsible for storing the master keys in local non-volatile secure storage (described in further detail below).

When the user attempts to view/run the digital content, the media player may authenticate itself to the PCU (i.e., using the master key), and the media player may then utilize the master key in the PCU or TPM local non-volatile secure storage to decrypt the various keys used for encrypting the media. After media-encryption keys are decrypted one at a time, the media player may use these keys to decrypt and play the digital content. In one embodiment, the media itself may be formatted into multiple small blocks, each of which may be encrypted and decrypted separately, thus further enhancing the security of the system (described in further detail below).

FIG. 1 illustrates a system (System 100) according to one embodiment of the present invention. Specifically, as illustrated, System 100 includes a media player (Media Player 105), an Integrity Measurement Module (IMM 110), a virtual machine monitor (VMM 115), a Portable Crypto Unit (PCU 120) and a Trusted Platform Module (TPM 125). System 100 may additionally include VIS Module 130 VCERT 135 and Protected Physical Memory 140.

Media Player 105 may be responsible for decrypting the media (using the set of the encryption keys associated with the media), decoding the media, and playing it. In one embodiment, the set of encryption keys associated with the media itself may be encrypted using a master key stored in PCU 120. Thus, Media Player 105 may periodically invoke PCU 120's services to decrypt each of these keys. According to one embodiment of the invention, the communication between the media player and the PCU may be secured to prevent snooping of decrypted keys using an encryption and VIS scheme similar to that described in the VIS Patent Application referred to above. For the purposes of simplicity, the VIS scheme is labeled in FIG. 1 as VIS Module 130 regardless of how it is implemented.

System 100 may additionally include IMM 110. IMM 110 maybe implemented in a variety of ways including the scheme described in co-pending patent application Ser. No. 11/967,928, entitled "Dynamic Generation of Integrity Manifest for Run-Time Verification of Software Program", filed on Dec. 31, 2007, assigned to the assignee of the present application (hereafter "IMM Patent Application") and hereby incorporated by reference. Although illustrated in FIG. 1 as coupled to VMM 115, embodiments of the invention are not so limited. Instead, IMM 110 may also be implemented within VMM 115 without departing from the spirit of embodiments of the invention. More importantly, according to one embodiment, IMM 110 may be implemented in any independent execution environment (e.g., a separate virtual machine (VM) or an embedded processor such as the Manageability Engine ("ME") on Intel™ Corporation's Active Management Technology ("AMT®")).

According to embodiments of the present invention, the functionality of IMM 110 may be utilized to establish the authenticity of Media Player 105 utilizing a manifest, and Media Player 105 may be allowed to retrieve keys from PCU 120 only if Media Player 105 passes IMM 110's authentication. Various other schemes may also be implemented to authenticate Media Player 105 without departing from the spirit of embodiments of the present invention.

According to an embodiment of the present invention, VMM 115 may virtualize the virtual memory on System 100 (e.g., by using page-table shadowing and/or nesting the page tables). The concept of VMMs is well known to those of ordinary skill in the art and further description thereof is omitted herein in order not to obscure embodiments of the invention. In one embodiment, VMM 115 may utilize the scheme presented in the VIS Patent Application. This scheme, also known as VT Integrity Service includes a "VIS Module 130", (as illustrated in FIG. 1) which enables partitioning of a single linear address space (e.g., within a single VM) into multiple "micro-contexts" and memory access between these micro-contexts may be restricted. Specifically, according to one embodiment of the present invention, VIS Module 130 (described further in the VIS Patent Application) may be leveraged to create a separate micro-context for Media Player 105. As a result of this restricted partitioning, the memory pages of the separate micro-context in which Media Player 105 resides may be protected (Protected Memory 140), thus preventing unauthorized software components from snooping the encryption keys. VMM 115 may additionally include VMM 115's public key (VCERT 135), for use to authenticate Media Player 105 to PCU 120 (described in further detail below).

In one embodiment of the invention, PCU 120 may provide a low horse-power, independent execution environment for utilizing the master keys used for encrypting the sets of keys that are used to actually encrypt the media. PCU 120 may comprise any form of secure, portable cryptographic device including devices such as Smart Cards or any other such tamper resistant device having a memory and the ability to perform minimal processing (e.g., a local processor). In an alternate embodiment, TPM 125 may be utilized to provide such an environment. Thus, once Media Player 105 is authenticated by IMM 110 and protected by the VMM using VIS Module 130, Media Player 105 may periodically contact PCU 120 (or TPM 125) over a secure channel, and retrieve the decrypted keys.

According to one embodiment of the invention, TPM 125 comprises the root of trust in System 100. As previously discussed, TPM 125 may comprise a secure memory coupled to a secure micro-controllers, with added cryptographic functionalities that conform to the standard promulgated by the TCG. TPM 125 includes a certificate verifying that it comes from a trusted vendor, and is a highly secure cryptographic unit. TPM 125 may be capable of performing a variety of cryptographic operations, including symmetric/asymmetric encryption, symmetric/asymmetric signing, hashing and random-number generation. Additionally, in one embodiment, TPM 125 may be capable of measuring VMM 115 with which System 100 was booted, and storing the measurement in one of its platform configuration registers (PCRs). In yet another embodiment, trusted code known as Authenticated Code Module may measure the VMM, and store the measurement in the TPM 125. TPM 125 may later be queried to provide this measurement in signed form, to validate the authenticity of Media Player 105.

Figure 2:
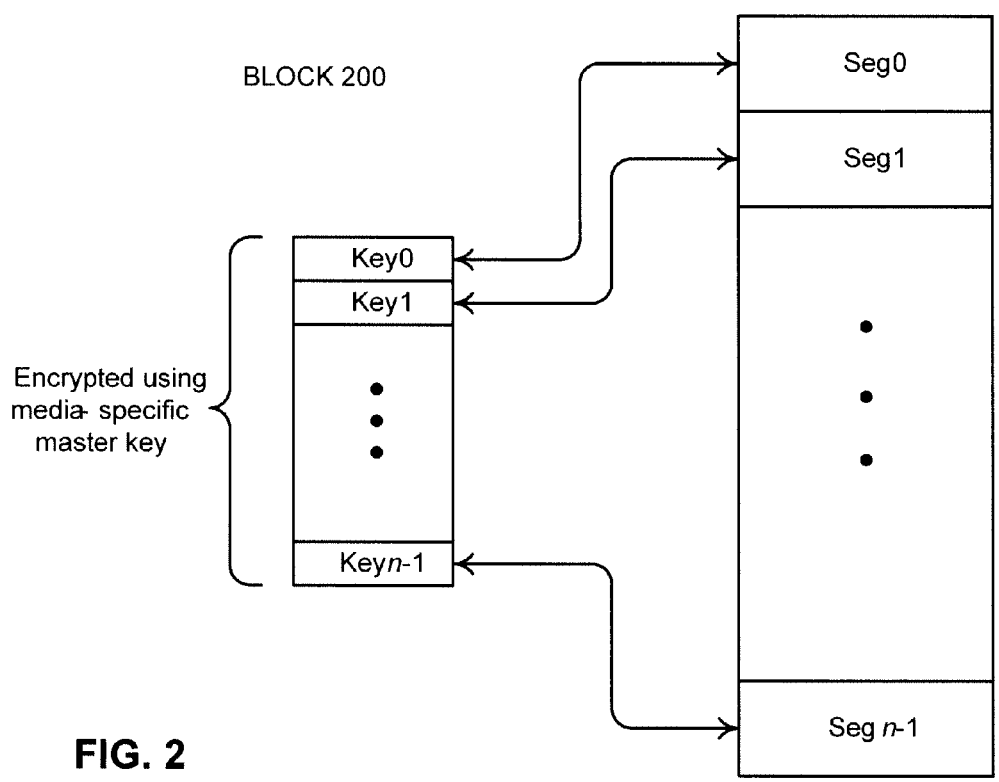
FIG. 2 illustrates a special media format for the protected content media according to embodiments of the present invention.

Embodiments of the present invention may include a special media format for the protected media, as illustrated in FIG. 2. Specifically, in one embodiment, the protected media may be divided into several blocks (Block 200 is shown), each block having relatively small segments (shown as Segment 0 to Segment n−1). Each Segment in Block 200 may include only a small portion of the media (e.g., a ten-second video clip). In one embodiment, each of these blocks may be encrypted using different encryption keys, and each encryption key may, in turn, be encrypted using a title key that is specific to the media (and/or the user). The encrypted keys may then be stored with the protected media, in the same or in a different file. Partitioning the media into this special format further enhances the security of System 100 by ensuring that different encryption keys are required to decrypt each block.

Thus, in one embodiment, to play the media, Media Player 105 may first establish a secure connection with PCU 120, send the encrypted block keys to PCU 120 over the secure channel, retrieve the decrypted block keys one at a time, and use the decrypted block keys to decrypt the media (one block at a time). In one embodiment, by dividing the media into multiple blocks, and using a separate key for encrypting each block, each user may be forced to keep PCU 120 plugged into System 100 while the media is being played. According to this embodiment, if PCU 120 is removed from System 100 while the media is being played, Media Player 105 will not be able to retrieve the next block key from PCU 120 and as a result, will stop playing the content.

Figure 3:
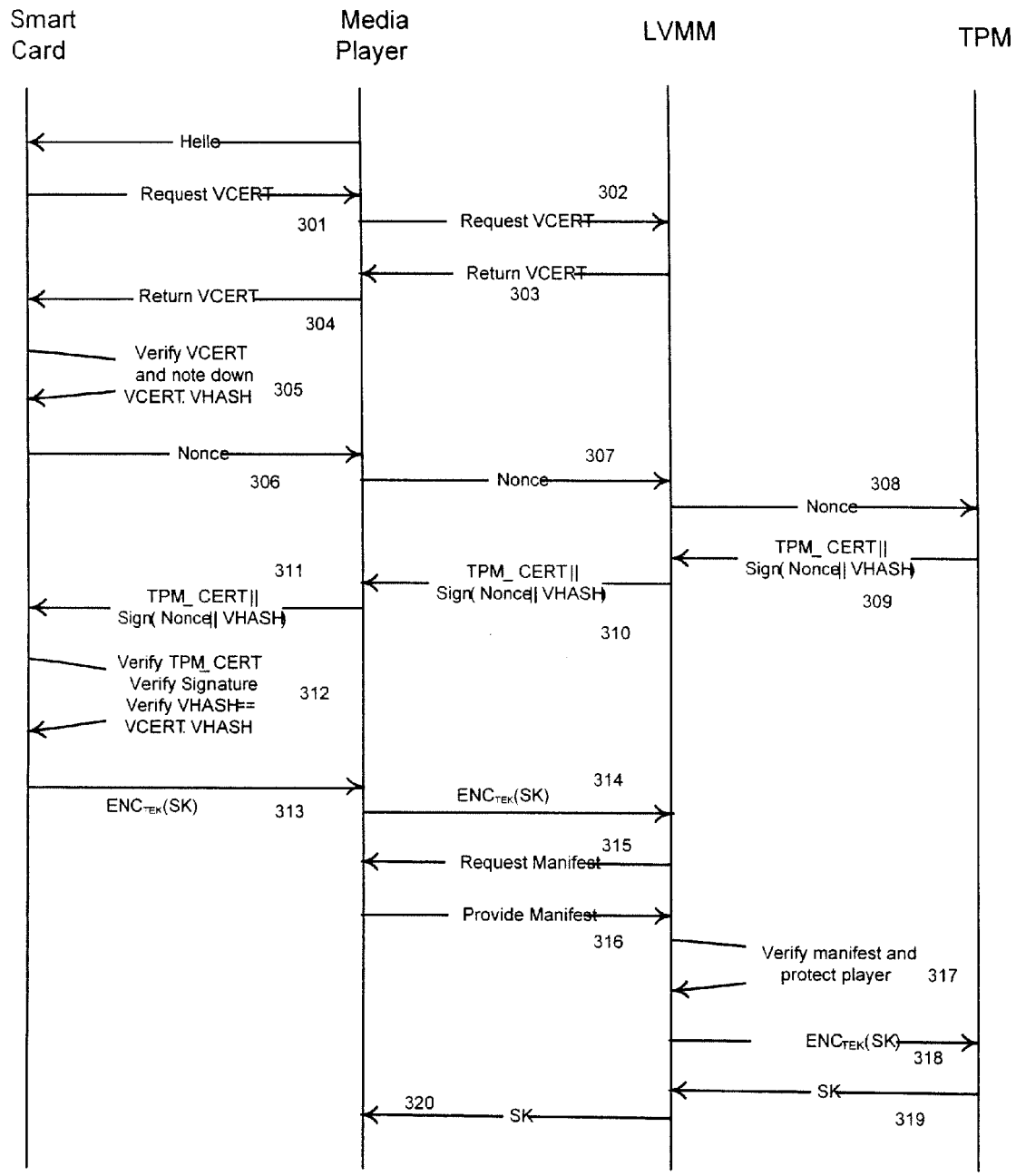
FIG. 3 illustrates the sequence of operations for authenticating a media player and establishing a secure channel between the media player and a PCU.

FIG. 3 illustrates the sequence of operations for authenticating Media Player 105 and establishing a secure channel between Media Player 105 and PCU 120. As illustrated, in one embodiment, in order to authenticate System 100 to PCU 120 in 301, Media Player 105 may request the certificate in 302 from VMM 115 and VMM 115 may present its certificate ("VCERT") to Media Player 105 in 303. The VCERT may list the hash of VMM 115's image and specifies that VMM 115 is a trusted VMM (i.e., it correctly implements VIS, and any access to VMM 115 is monitored). In 304, Media Player 105 may forward the VCERT to PCU 120, which may verify the signature on this certificate and save VMM 115's hash specified in the certificate (VCERT.VHASH) for later use in 305.

According to one embodiment, PCU 120 may then generate a random nonce and hand the random nonce over to Media Player 105 in 306. Media Player 105 may in turn forward this nonce to TPM 125 via VMM 115 (307 and 308). TPM 120 may respond to Media Player 105 via VMM 115 (309 and 310) with a message that contains TPM 125's public-key certificate ("TPM_CERT") and a signed sub-message containing the hash of VMM 115 as was measured at boot time ("VHASH") and the provided random nonce. Media Player 105 may forward this message in 311 to PCU 120 and PCU 120 may verify TPM 125's certificate, then verify the signature on the embedded sub-message using the public key in the VCERT in 312. PCU 120 may then compare the VHASH from the message with VCERT.VHASH in 312. If there is a match, PCU 120 may be assured that: i) the platform has a trusted TPM; ii) any message encrypted using the key provided in TPM 125's certificate may only be decrypted by TPM 125; and iii) System 100 is booted using a compliant VMM 115 (one that correctly implements VIS and monitors every access to the TPM).

In one embodiment, once the secure session is established between Media Player 105 and TPM 125, PCU 120 may in 313 generate a session key, encrypt the session key using TPM 125's encryption key (TEK), and hand the encrypted session key over to Media Player 105. At this point, Media Player 105 may pass the encrypted session key to VMM 115 in 314, which in turn may ask Media Player 105 to provide its manifest in 315. Once Media Player 105 responds with a manifest in 316, VMM 115 (and IMM 110) may use the manifest in 317 to verify that: i) Media Player 105 is a trusted piece of software which has been loaded to the memory without being tampered with; and ii) Media Player 105 is authorized to establish a secure connection with PCU 120. Since the details of IMM 110 are described in the co-pending IMM Patent Application additional description of this verification is omitted herein.

According to one embodiment of the invention, once the run-time, in-memory image of Media Player 105 has been verified, VMM 115 may leverage TPM 125 to decrypt the session key in 318, and deposit the decrypted session key into a protected memory region of Media Player 105 in 319. At this point, Media Player 105 has established a trusted channel with PCU 120. Since the session key corresponding to this channel resides in protected memory of Media Player 105, data flowing across this channel may not be snooped, and PCU 120 may securely transfer decrypted block keys to Media Player 105 in 320.

Figure 4:
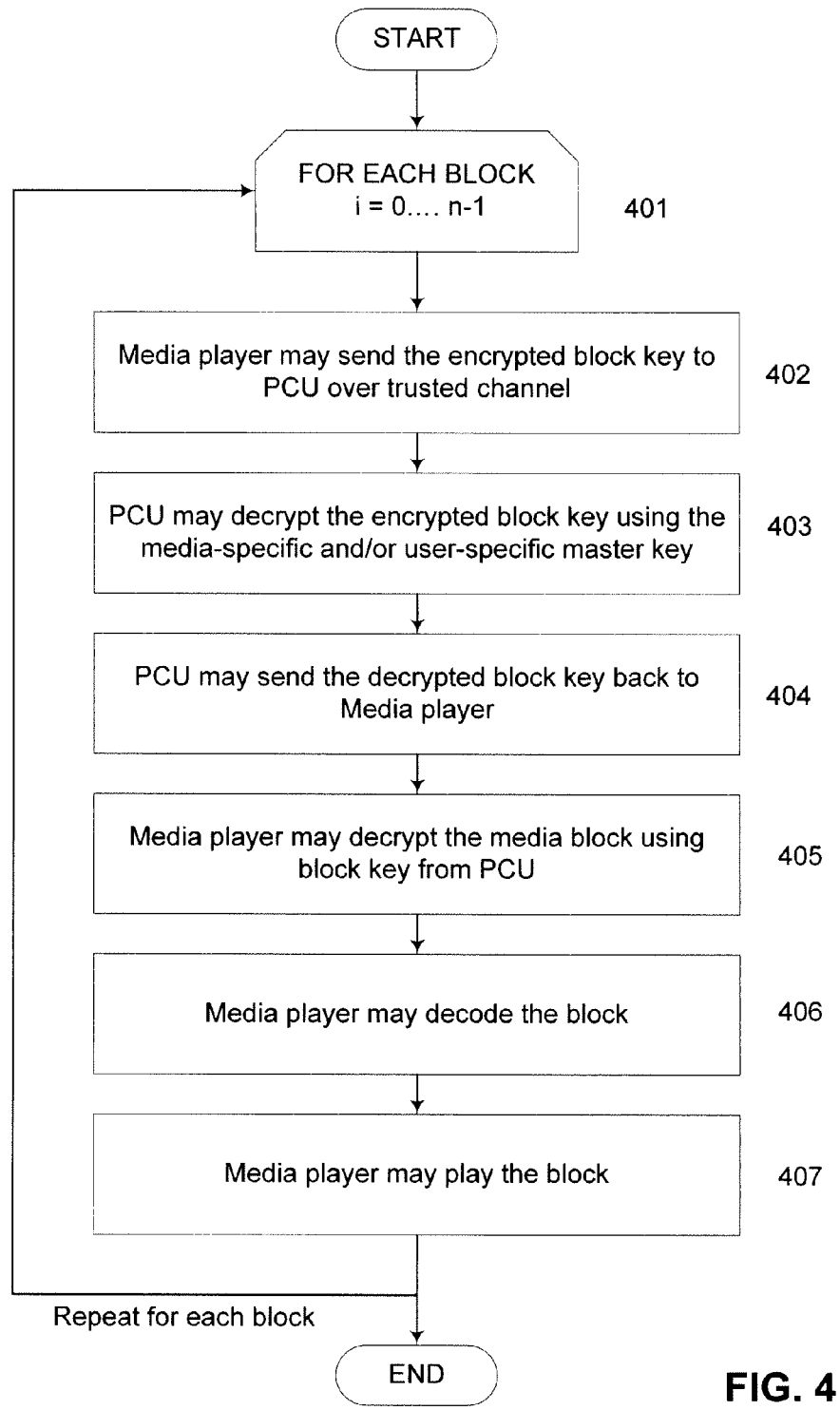
FIG. 4 is a flow chart illustrating how a media player may handle each block of the media file according to an embodiment of the invention.

According to embodiments of the invention, once Media Player 120 has established a secure channel with PCU 120, it may work on the media file one block at a time. FIG. 4 is a flow chart illustrating how Media Player 120 may handle each block of the media file according to an embodiment of the invention. Although the following operations may be described as a sequential process, many of the operations may in fact be performed in parallel and/or concurrently. In addition, the order of the operations may be re-arranged without departing from the spirit of embodiments of the invention. As illustrated, for each block in 401, Media Player 105 may send the encrypted block key to PCU 120 over the trusted channel in 402 and PCU 120 may decrypt the encrypted block key using the media-specific and/or user-specific master key in 403. PCU 120 may then in 404 send the decrypted block key back to Media Player 105 and Media Player 105 may decrypt the media block using this block key in 405, decode the block in 406 and play the block in 407.

The scheme according to embodiments of the present invention may be implemented on a variety of computing devices. According to an embodiment, a computing device may include various other well-known components such as one or more processors which can be specialized Reduced Instruction Set Computer (RISC) engines or general purpose processing engines. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including Ethernet, Gigabit Ethernet, PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for playing media, comprising:
   instantiating a media player within memory space of a machine that is managed by a virtual machine manager of the machine, wherein
   the media player is configured to access encrypted media that includes a plurality of blocks, each of the plurality of blocks encrypted with a block encryption key, and the block encryption keys are made available encrypted;
   authenticating the media player to a portable secure device removably coupled to the machine, the portable secure device containing a master key capable of decrypting each of the block encryption keys, wherein the authentication of the media player
   provides a secure channel between the media player and the portable secure device; and
   for each of the plurality of blocks, by the media player
       sending, over the provided secure channel, an encrypted block encryption key to the portable secure device;
       receiving, over the provided secure channel, a decrypted block encryption key from the portable secure device, wherein the decrypted block encryption key is decrypted by the portable secure device;
decrypting the block of encrypted media with the received decrypted block encryption key; and
playing the decrypted block,
wherein the media player, responsive to removal of the portable secure device from the machine, stops playing the media.

2. The method according to claim 1 wherein authenticating the media player to the portable secure device further comprises the virtual machine manager mediating the media player interaction with the portable secure device.

3. The method according to claim 2 further comprising the virtual machine manager utilizing a virtual technology integrity scheme to create a plurality of micro-contexts in the managed memory space, wherein instantiating the media player comprises instantiating the media player in a protected one of the plurality of micro-contexts; and wherein playing comprises playing decrypted blocks by the media player under protection of the virtual machine manager.

4. The method according to claim 3 further comprising the virtual machine manager providing the media player with a certificate of the virtual machine manager; wherein authenticating the media player to the portable secure device comprises verifying the virtual machine manager to the portable secure device, based at least in part on the certificate of the virtual machine manager.

5. The method according to claim 4 further comprising the portable secure device responding to the receipt of the virtual machine manager certificate from the media player by providing the media player with a random nonce, and the media player authenticating the portable secure device to a trusted platform module of the machine with the random nonce to establish the secure channel between the media player and the portable secure device.

6. The method according to claim 5 wherein decrypting each of the block encryption keys with the master key further comprises the media player retrieving the master key from the portable secure device via the provided secure channel, and storing the master key in a secure memory of the machine; and wherein the trusted platform module utilizes the master key to decrypt each of the block encryption keys to recover decrypted block encryption keys for the media player.

7. A system, comprising:
a media player configured to receive encrypted media, decrypt and play the media, wherein the encrypted media includes a plurality of blocks, each of the plurality of blocks encrypted with a block encryption key and the plurality of block encryption keys are made available encrypted;
a device interface configured to removably accept and couple a portable secure device to the system, the device to contain a master key that enables decryption of the encrypted block encryption keys; and
a virtual machine manager configured to manage memory space of the system, and instantiate the media player in the managed memory space;
wherein the media player is further configured to:
authenticate to the portable secure device to provide a secure channel between the media player and the portable secure device;
for each of the plurality of blocks,
send, over the provided secure channel, an encrypted block encryption key to the portable secure device;
receive, over the provided secure channel, a decrypted block encryption key from the portable secure device, wherein the decrypted block encryption key is decrypted by the portable secure device;
decrypt the block of encrypted media with the received decrypted block encryption key; and
play the decrypted block; and
stop playing the media when the portable secure device is removed from the machine.

8. The system according to claim 7 wherein the virtual machine manager is further configured to utilize a virtual technology integrity scheme to create a plurality of micro-contexts, and instantiate the media player in a protected one of the plurality of micro-contexts, to enable the media player to play the media under protection of the virtual machine monitor.

9. The system according to claim 8 wherein the virtual machine manager is further configured to provide the media player with a certificate of the virtual machine manager for use by the media player to authenticate the media player to the portable secure device through verification of the virtual machine manager to the portable secure device.

10. The system according to claim 9 further comprising a trusted platform module configured to recover the block encryption keys for media player, using the master key;
wherein the portable secure device is configured to, on verification of the virtual machine manager, provide the media player with a random nonce; and
wherein the media player is further configured to authenticate the portable secure device to the trusted platform module with the random nonce.

11. The system according to claim 10 further comprising a secure memory coupled to the media player, wherein the media player is further configured to retrieve the master key from the secure device via the secure channel, and store the master key in the secure memory.

12. The system according to claim 11 wherein the trusted platform module comprises the secure memory.

13. A tangible, non-transitory computer-readable medium having stored thereon instructions that, when executed by a machine, cause the machine to be equipped with a media player;
wherein the machine includes a virtual machine manager configured to manage memory space of the machine, including memory space where the media player resides and executes; and
wherein the media player is configured to:
access encrypted media, the encrypted media including a plurality of blocks, each of the plurality of blocks encrypted with a block encryption key, and the block encryption keys are made available encrypted;
authenticate the media player to a portable secure device removably coupled to the machine, and containing a master key capable of decrypting each of the encrypted block encryption keys to enable the master key to be available to decrypt the encrypted block encryption keys;
communicate with the portable secure device over a secure channel between the media player and the portable secure device, the secure channel provided by the authenticating the media player to the portable secure device, wherein the communication with the portable secure device ceases when the portable secure device is removed from the machine; and
for each of the plurality of blocks,
send over the provided secure channel an encrypted block encryption key to the portable secure device;
receive over the provided secure channel a decrypted block encryption key from the portable secure device, wherein the decrypted block encryption key is decrypted by the portable secure device,
decrypt the block of encrypted media with the received decrypted block encryption key; and
play the decrypted block.

14. The medium according to claim 13 wherein the virtual machine manager is further configured to mediate the media player interaction with the portable secure device.

15. The medium according to claim 14 wherein the virtual machine manager is further configured to utilize a virtual technology integrity scheme to create a plurality of micro-contexts, and instantiate the media player in a protected one of the plurality of micro-contexts.

16. The medium according to claim 15 wherein the virtual machine manager is further configured to provide the media player with a certificate of the virtual machine manager for the media player to authenticate the media player with the portable secure device through verification of the virtual machine manager to the portable secure device, based at least in part on the certificate.

17. The medium according to claim 16 wherein the machine further comprises a trusted platform module; wherein the portable secure device is configured to, on verification of the trusted virtual machine manager, provide the media player with a random nonce; wherein the media player is further configured to authenticate the portable secure device to the trusted platform module with a random nonce from the portable secure device; and wherein the trusted platform module is configured to, on authentication of the portable secure device, recover the block encryption keys using the master key.

18. The medium according to claim 17 wherein the machine further comprises a secure memory; and wherein the media player is further configured to retrieve the master key from the portable secure device via the secure channel, and store the master key in the secure memory.

19. A media player having a processor and a memory having executable instructions stored thereon that, when executed on the processor, cause the media player to:
access encrypted media, the encrypted media including a plurality of blocks, each of the plurality of blocks encrypted with a block encryption key, and the block encryption keys are made available encrypted;
authenticate the media player to a portable secure device removably coupled to a machine associated with the media player, the device containing a master key capable of decrypting each of the encrypted block encryption keys to enable the master key to be available to decrypt the encrypted block encryption keys;
communicate with the portable secure device over a secure channel between the media player and the portable secure device, the secure channel provided by the authenticating the media player to the portable secure device, wherein the communicating with the portable secure device ceases when the portable secure device is removed from the machine; and
for each of the plurality of blocks,
send over the provided secure channel an encrypted block encryption key to the portable secure device;
receive over the provided secure channel a decrypted block encryption key from the portable secure device, wherein the decrypted block encryption key is decrypted by the portable secure device,
decrypt the block of encrypted media with the received decrypted block encryption key; and
play the decrypted block.

* * * * *